CASCADED TRANSISTOR AMPLIFIER BIASING ARRANGEMENT

Filed Sept. 27, 1963

INVENTORS S. T. BREWER
R. G. BUUS
J. J. KASSIG
BY [signature]
ATTORNEY 3,254,303

CASCADED TRANSISTOR AMPLIFIER BIASING ARRANGEMENT

Sherman T. Brewer, Chatham Township, Morris County, Robert G. Buus, Plainfield, and Julius J. Kassig, South Plainfield, N.J., assignors to Bell Telephone Laboratories, Incorporated, New York, N.Y., a corporation of New York Filed Sept. 27, 1963, Ser. No. 312,119
4 Claims. (Cl. 330—22)

Figure 1:
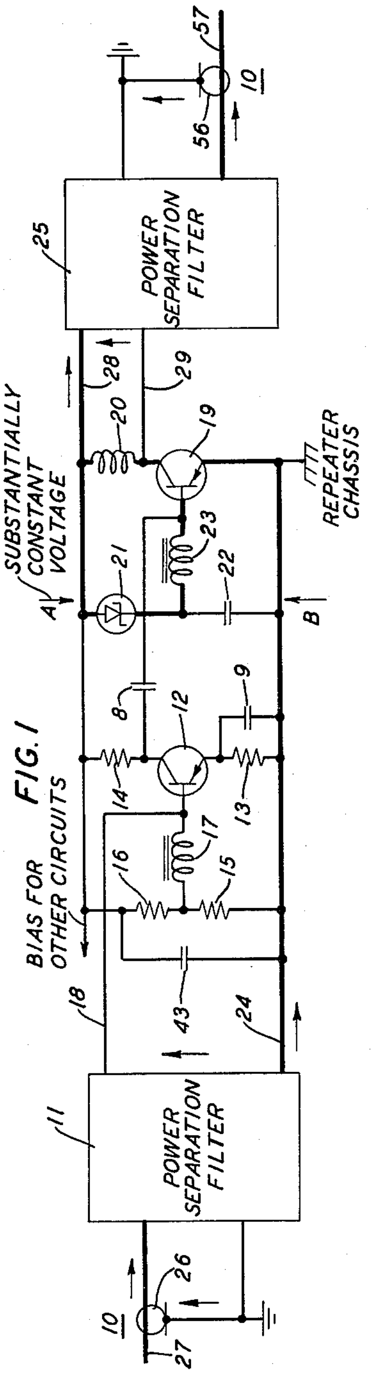

This invention relates to signal repeaters and more particularly to repeaters for communication lines which are supplied with substantially constant current.

Signal repeaters are frequently remotely located along a communication line. For example, in a submarine cable system, the repeaters are remotely located at the bottom of the ocean at periodic intervals along the cable. It is well known that local sources of power for the repeaters are not generally available. This unavailability of local power for the repeaters also applies to some relatively long overland communication lines.

In the aforementioned submarine cable and overland communication systems, it has been heretofore found desirable to supply power to the remotely located signal repeaters by means of a direct current in the line which is regulated at the line terminals to be substantially constant. The constant direct current is carried in the same conductor that experiences a signal voltage variation with respect to earth or sea ground. Since the direct current is the same at all points along the line, a standardized repeater design is used by connecting all of the repeaters in series in the direct current path.

Because of the distances over which power must be transmitted, it is desirable to keep the direct current in the line and the terminal direct-current voltages of the line as low as possible. Therefore, transistors are desirable as efficient amplifying elements in remotely located repeaters of communication systems using constant direct current in the line. In this context, "line" is understood to be a generic term including both submarine cable and land line.

Furthermore, the compactness of transistorized repeaters would facilitate ship arrangements for storing and paying out submarine cable systems. For this reason, it is also desirable to minimize the number of components in each transistor repeater.

Applicants have recognized that while transistors are efficient and compact, they require relatively greater stability of their operating point voltages and currents than do the prior art vacuum tubes.

An object of this invention is to provide stably biased transistor amplifiers and a minimal number of components for repeaters which are located along a communication line which is supplied with a substantially constant direct current.

Still another object of this invention is to obtain improved repeater efficiency and lower end-to-end direct-current voltage drop along a communication line which is supplied with a substantially constant current.

In accordance with the present invention a single high power transistor is employed both as the final amplying stage of a repeater and also as a regulator which operates in combination with a particularly arranged constant voltage device, such as a Zener diode, to stabilize the direct-current voltage drop across the repeater despite changes in impedance of any of the components in the repeater. This stabilized voltage drop is then employed as the bias voltage for other stages in the repeater. Therefore, the other stages may use transistor amplifiers with simple, inexpensive resistive biasing circuits.

Specifically, the high current emitter-collector path of the high power transistor is interposed directly in series with the regulated, constant direct-current path of the communication line without any other direct-current impedance in series therewith. The constant voltage Zener diode establishes the base bias of the high power transistor at a constant direct-current voltage with respect to its collector. Thus, any impedance disturbance in the system which tends to change the emitter-collector direct-current voltage of the power transistor will cause a voltage change to appear initially between its emitter and base. Since a small emitter-base current change produces a much larger emitter-collector current change, the disturbance is absorbed when the power transistor takes a changed percentage of the constant direct current along the line. Thus, the direct-current voltage change which would otherwise occur across the repeater is minimized. Since the direct-current change through the power transistor required to stabilize any practical disturbance is small compared to its total direct current, the operating point of the power transistor as an amplifier is not substantially changed.

Special features of the invention reside in the way in which choke-type inductances in the base circuit of each transistor, a load inductance in the collector circuit of the power transistor and direct-current blocking capacitors coupled to the base and from the collector of each transistor as a signal path allow the transistors to appear in cascade across the line for signal amplification and in a parallel combination that is connected serially in the direct-current path of the cable for bias purposes. In particular, these connections allow the power transistor emitter to be grounded to the repeater chassis both for alternating current and direct current. Such an emitter ground has particular advantage in the submarine cable application of the invention by reducing emitter lead inductance, eliminating the wasteful power dissipation in, and the voltage drop across, an emitter biasing resistor, which would otherwise be required by conventional resistive bias. Furthermore, the emitter may be connected directly to the transistor case, which in turn may be mounted directly on the repeater chassis, which thereby becomes a heat sink for the power transistor.

Thus, it may be seen that a transistorized signal repeater according to the invention is particularly well adapted for use along a communication line which is supplied with a substantially constant current.

Figure 3:
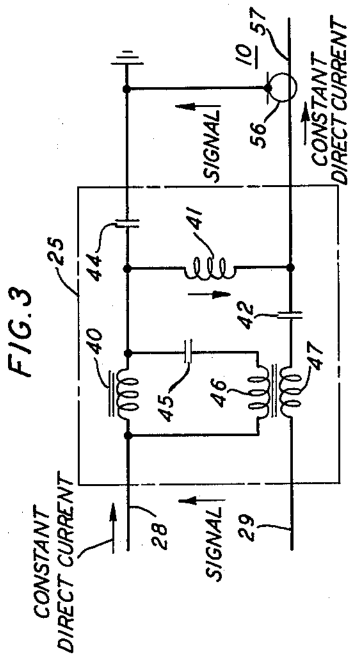
Figure 2:
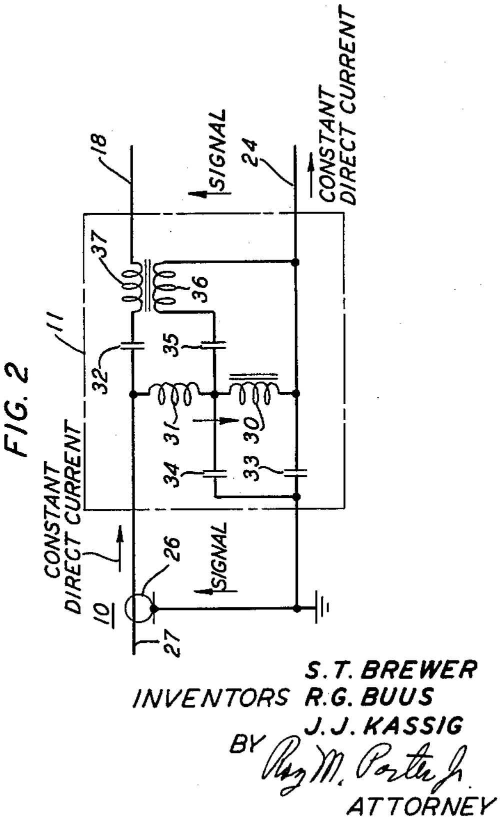

Further understanding of the invention may be apprehended from the following detailed description of the invention and the drawing, in which:

FIG. 1 is a schematic and block diagrammatic showing of a preferred embodiment of the invention; and FIG. 2 and FIG. 3 show details of preferred power separation filters for use with the invention.

In FIG. 1 the incoming portion of a communication line or submarine cable 10 carries a signal between its center conductor 27 and its outer conductor 26 and a substantially constant direct current along the center conductor 27. The signal is a varying voltage between center and outer conductors which has information content. The signal may be, for example, one or more telephone conversations.

As is well known in the art, the signal will gradually be attenuated as it travels along communication line 10, so that it is necessary to introduce amplification at spaced intervals along the line.

The outer conductor 26 of the incoming portion of line 10 is preferably maintained at ground, that is, earth or sea potential, as is also the outer conductor 56 of the outgoing portion of line 10; and a large portion, or all, of the direct current carried by center conductors 27 and 57 will return through the earth or the sea.

In order to amplify the signal in line 10, it has been heretofore found convenient to couple the incoming portion of the line to a power separation filter 11 having an output conductor 24 that carries the substantially constant direct current but experiences negligible alternating current voltage variation with respect to earth or sea ground. Conductor 24 and ground may be called the power channel of filter 11. The other output conductor 18 of power separation filter 11 experiences alternating-current potential variation with respect to output conductor 24 but carries no direct current. Conductors 18 and 24 may be called the signal channel of filter 11. Similarly, input conductors 28 and 29 of power separation filter 25 carry the amplified alternating current signal; and input conductor 28 carries the substantially constant current with negligible potential variation with respect to earth or sea ground.

Between output terminals 18 and 24 of power separation filter 11 and input terminals 28 and 29 of power separation filter 25 is connected a transistorized signal repeater according to the invention.

The second amplifying stage of the repeater includes a transistor 19 that has a biasing arrangement that is believed to be uniquely adapted to its environment, particularly to the fact that it must share a substantially constant current with the biasing circuitry of the previous stage.

The principal paths for current between conductors 24 and 28, that is, between points A and B, are shown in FIG. 1 with heavy black lines. By far the largest current flows through the emitter-collector path of transistor 19 and inductor 20. The current through the emitter and base junction of transistor 19 and Zener diode 21 is smaller than the collector current because of current amplification by transistor 19, but is still substantial in comparison to the total currents drawn in the preceding amplifier stages.

The emitter electrode of transistor 19 is connected to direct-current conductor 24 of power separation filter 11, which is also connected to the repeater chassis. It may be noted that, according to a feature of the invention, no emitter resistor is required. Moreover, if the casing of transistor 19 is connected to its emitter, the casing may be mounted in intimate contact with the repeater chassis, which then becomes the heat sink for power transistor 19. If the casing of transistor 19 is connected to its collector, the casing must be insulated from the repeater chassis.

A collector load inductor 20 having negligible direct-current resistance is connected between the collector electrode of transistor 19 and direct-current conductor 28 of power separation filter 25. It may be noted that load inductor 20 will produce very little resistive heating and will absorb very little direct-current voltage drop. Signal frequency choke 23 and Zenor diode 21 are connected in series between the base electrode of transistor 19 and direct-current conductor 28 of power separation filter 25, with the cathode of Zener diode connected to choke 23 and its anode connected to conductor 28. Since a base voltage divider like resistors 15 and 16 of transistor 12 is not needed by transistor 19, both the current and power demands of the repeater are thereby reduced.

It may be noted that the first amplifying stage of the repeater includes a transistor 12 that has resistive biasing circuitry of the general type well-known in the transistor art. Of interest with respect to the present invention is the fact that the resistors 13, 14, 15 and 16, comprising the resistive bias circuitry, form part of a current path between points A and B. In other words, the resistive biasing circuitry is connected in parallel with the principal current paths provided by transistor 19 between points A and B.

In accordance with the invention, the cooperation between Zener diode 21 and transistor 19 tends to oppose changes in the biasing of preamplifier transistor 12.

Suppose that as a result of heating and aging the base-emitter impedance of transistor 12 increases. In the absence of transistor 19 and Zener diode 21, more of the constant current from conductor 24 would flow through resistor 15 and less of it would flow through emitter resistor 13. Both of these effects would increase the emitter-base voltage bias of transistor 12. In addition, in the absence of transistor 19 and Zener diode 21, the total voltage between conductors 24 and 28 would increase by virtue of the increased net resistance presented therebetween by transistor 12 and its biasing resistors.

However, with power amplifier transistor 19 and Zener diode 21 connected as heretofore described, any voltage increase between conductors 24 and 28 in turn increases the emitter-base voltage of power amplifier transistor 19 by virtue of the constant voltage across Zener diode 21. As a consequence of a diode-like behavior of the base-emitter junction of transistor 19, the base electrode current of transistor 19 increases by a greater percentage than the emitter-base voltage. The increased base electrode current of transistor 19 lowers the emitter-collector impedance of transistor 19, and the collector direct current of transistor 19 rises by a much greater percentage than the base current because of the current amplifying characteristic of transistor 19. The additional current which the emitter of transistor 19 consequently demands from the constant current in conductor 24 is taken from resistors 15 and 13 and reduces the voltages which the disturbance of the emitter-base impedance of transistor 12 would otherwise produce across them. It is important to see that the difference between these voltages across resistors 13 and 15, which difference is the base-emitter voltage of transistor 12, does not increase as much as it would in the absence of the regulation of the voltage between conductors 24 and 28 by transistor 19 and Zener diode 21. It may also be seen that the voltage between points A and B does not rise as much as it would if transistor 19 and Zener diode 21 were not present, or if transistor 19 had ordinary resistive bias. The latter comparison is apparent because the resistances of Zener diode 21 and transistor 19 both vary inversely with direct current through them, while the ordinary series biasing resistances would not.

It will be noted that, while the action which tends to correct the base-emitter voltage bias of transistor 12 changes the emitter electrode current of power amplifier transistor 19, this change is relatively negligible because power amplifier transistor 19 draws far greater currents than preamplifier transistor 12. It has been found that, even if several preamplifier stages with circuitry similar to that of transistor 12 are used, the stability of the amplifying performance of transistor 19 remains substantially unimpaired. A possible explanation for this may be as follows. The base-to-emitter direct-current voltage of transistor 19 changes in every case by a smaller amount than the base current. In this respect, the base-emitter junction is similar to a forward-biased diode. Therefore, the sum of the voltage across Zener diode 21 and the voltage across the base-emitter junction of power transistor 19 must remain substantially constant with respect to current changes through them. As a consequence, the direct-current voltage between points A and B, which determines the direct-current voltage drop across the emitter and collector of transistor 19, must also remain constant.

In the preferred case in which the resistance of inductor 20 is smaller than, or even negligible with respect to, the emitter-collector resistance of transistor 19, the rise in collector electrode direct current has been found to be substantially proportional to any rise in base electrode direct current. Thus, it is believed that the lack of resistance in series with the emitter and collector electrodes may contribute to the fact that the amplifying performance of transistor 19 is relatively independent of the changes in its direct-current bias caused by its regulating action.

The subsidiary aspects of the arrangement and operation of the circuitry of the preferred embodiment of the invention may be explained in detail as follows.

An emitter resistance 13 is connected between the emitter of PNP transistor 12 and direct-current output conductor 24. A collector load resistance 14 is connected between the collector of transistor 12 and direct-current input conductor 28 of power separation filter 25. Capacitor 9 is connected across emitter resistor 13 for bypassing signal currents around resistor 13. A voltage divider comprising resistors 15 and 16 is also connected between direct-current conductors 24 and 28, and a signal-current bypass capacitor 43 is connected across resistors 15 and 16. The signal frequency choke 17 is connected between the base electrode of transistor 12 and the junction of resistors 15 and 16. The signal conductor 18 is connected to a point between signal frequency choke 17 and the base electrode of transistor 12 to apply the signal from the filter 11 to transistor 12.

The amplified signal between the collector of transistor 12 and conductor 24 is applied through coupling capacitor 8 across the base-emitter junction of power amplifier transistor 19. The output signal across inductor load 20 is applied by conductors 28 and 29 to power separation filter 25.

Capacitor 22 is connected from the cathode of Zener diode 21 to direct-current conductor 24 for bypassing any signal currents which pass from coupling capacitor 8 through choke 23 to chassis ground. Capacitors 22 and 43 also filter out noise generated by Zener diode 21.

A preferred form of power separation filter 11 is shown in FIG. 2 and a preferred form of power separation filter 25 is shown in FIG. 3. The power separation filters 11 and 25 as shown in FIGS. 2 and 3, respectively, are designed to reduce any stray capacity effects between the signal and power channels, as taught in the patent No. 3,105,125 of the applicant J. J. Kassig, issued September 24, 1963. As shown in FIG. 2, the direct current flows from conductor 27 through inductances 31 and 30 in sequence and then through conductor 24 at the output of power separation filter 11. Capacitor 34 provides that substantially all of the signal voltage is applied across inductor 31, while filter capacitor 33 eliminates any remaining signal voltage with respect to ground tending to appear at direct-current conductor 24. The connection of the series combination of capacitor 35 and inductor 36 from one side of inductor 31 to conductor 24 and the connection of the series combination of capacitor 32 and inductor 37 from the other side of inductor 31 to output conductor 18 to establish conductors 18 and 24 as the signal path at the output of power separation filter 11. Inductors 36 and 37 present no substantial impedance in the signal path because their mutual inductances tend to neutralize the effect of their self-inductances. However, signal currents are inhibited from flowing through just one of inductors 36 and 37 and returning by a leakage path, as is more fully explained in the above-cited application of the applicant J. J. Kassig. It will be noted that power separation filter 11 as shown in FIG. 2 of the present application differs from FIG. 3 of the above cited application only in that the direct current blocking capacitor 35 and the choke inductor 30 that shunts the combination of capacitor 35 and inductor 36 eliminate the problem of direct-current saturation of the core of inductors 36 and 37.

In the output power separation filter 25, which actually recombines the direct current and the signal, the signal passes readily through coupled inductors 46 and 47, respectively, because the self-inductance of each is substantially neutralized by the mutual inductance between them, in the manner hereinbefore explained for power separation filter 11 of FIG. 2. The signal further passes through capacitors 42, 45 and 44 without appreciable attenuation and is applied between conductors 56 and 57 of the outgoing section of communication line 10.

The substantially constant direct current in input conductor 28 of filter 25 passes through signal choke inductor 40 and inductor 41 to center conductor 57 of the outgoing section of communication line 10, thereby recombining with the signal, as amplified. The same substantially constant direct current may be utilized in successive repeaters connected serially in the direct-current path of line 10 for bias purposes, in the manner herein described for a single repeater according to the invention.

It is noted that a repeater according to the invention may also be used in conjunction with directional filters to amplify signals traveling in both directions, as shown in the above-cited application of the applicant J. J. Kassig.

Various additional modifications of the invention might be made. For example, it should be understood that a ground return is not necessary for practicing the invention. Other power separation filters may replace filters 11 and 25 in practicing the invention. Transistors 12 and 19 could be of the NPN type with appropriate circuit modification, for instance, if the direction of direct-current flow were reversed. If the direction of current flow and the type of transistor 19 were reversed, the polarity of Zener diode 21 would be reversed. Additional cascaded amplifier stages similar to the stage including transistor 12 might be cascaded with transistors 12 and 19. In addition, other circuits located near the repeater might be biased by the constant voltage appearing between conductors 24 and 28, i.e., between points A and B.

In all cases it is understood that the above-described arrangements are illustrative of a small number of the many possible specific embodiments which can represent applications of the principles of the invention. Numerous and varied other arrangements can readily be devised in accordance with these principles without departing from the spirit and scope of the invention.

What is claimed is:

1. A signal repeater for a communication line having an incoming section and power separation filter delivering a substantially constant direct current via a first conductor and a communication signal between a second conductor and the first conductor and having an outgoing section and power separation filter receiving the direct current via a third conductor and the amplified signal between a fourth conductor and the third conductor, comprising first, second, third and fourth terminals connectable to the first, second, third, and fourth conductors, respectively; a first transistor having a first emitter electrode connected to said first terminal, a first base electrode coupled to said second terminal, and a first collector electrode; a first impedance connecting said first collector electrode to the third terminal; a second transistor having a second emitter electrode connected to said first terminal, a second base electrode coupled to said first collector electrode, and a second collector electrode coupled to said fourth terminal; a second impedance connected between said second collector electrode and said third terminal; and a signal blocking impedance and a constant voltage device connected in series directly between said second base electrode and said third terminal.

2. A signal repeater according to claim 1 in which the second impedance is an inductor having negligible direct-current resistance, the signal-blocking impedance is a choke inductor, and the constant voltage device is a Zener diode connected in break-down polarity.

3. A signal repeater for a communication line having an incoming section and power separation filter delivering a substantially constant direct current via a first conductor and a communication signal between a second conductor and the first conductor and having an outgoing section and power separation filter receiving the direct current via a third conductor and the amplified signal between a fourth conductor and the third conductor, comprising first, second, third and fourth terminals connectable to the first, second, third and fourth conductors, respectively; a first transistor having a first base electrode coupled to the second terminal and having a first emitter electrode and a first collector electrode; a resistance-capacitance bias circuit connecting said first emitter electrode to said first terminal; a resistive load impedance connecting said first collector electrode to said third terminal; a second transistor having a second base electrode coupled to said first collector electrode, a second emitter electrode connected directly to said first terminal and a second collector electrode coupled to said fourth terminal; an inductive load impedance of negligible resistance connecting said second collector electrode to said third terminal; and a choke inductor and Zener diode connected in series directly between said second base electrode and said third terminal, said Zener diode being connected in breakdown polarity.

4. In combination, a communication line having incoming and outgoing sections supplied with a substantially constant direct current, a first power separation filter having an input connected across said incoming section and having an output circuit including a first capacitor for conducting alternating current while blocking said direct current and a first inductor for conducting said direct current, a second power separation filter having an output connected across said outgoing section and having an input circuit including a second capacitor for conducting alternating current while blocking said direct current and a second inductor for conducting said direct current, a first transistor having base, emitter, and collector electrodes, an emitter resistor connected between said first transistor emitter electrode and said first inductor, a collector load resistor connected between said first transistor collector electrode and said second inductor, a first filter capacitor connected across said emitter resistor, means for coupling said first capacitor to said first transistor base electrode, a voltage divider connected between said first and second inductors, a second filter capacitor connected across said voltage divider, a first signal frequency choke connected between said first transistor base electrode and an intermediate point on said voltage divider, a second transistor having base, emitter, and collector electrodes, an inductive load connected in series with said second transistor emitter and collector electrodes between said first and second inductors, capacitive means for coupling said collector electrode of said first transistor to said base electrode of said second transistor, means for coupling said collector electrode of said second transistor to said second capacitor, a second signal frequency choke and a third filter capacitor connected serially between said second transistor base electrode and said first inductor, said second choke separating said capacitive coupling means and said third filter capacitor, and a Zener diode connected serially with said third filter capacitor between said first and second inductors for opposing changes in direct-current voltage between said second and fourth conductors.

References Cited by the Examiner

UNITED STATES PATENTS

| | | | |
|---|---|---|---|
| 2,850,650 | 9/1958 | Meacham. | |
| 3,028,509 | 4/1962 | Teltscher et al. | 330—40 X |
| 3,050,644 | 8/1962 | Ironside. | |
| 3,080,528 | 3/1963 | Davidson | 330—24 X |
| 3,089,968 | 5/1963 | Dunn. | |

ROY LAKE, *Primary Examiner.*

F. D. PARIS, *Assistant Examiner.*